United States Patent [19]

Campbell, Jr.

[11] Patent Number: 4,665,046

[45] Date of Patent: May 12, 1987

[54] ORGANOACTINIDE POLYMER CATALYSTS

[75] Inventor: Richard E. Campbell, Jr., Midland, Mich.

[73] Assignee: The Dow Chemical Company, Midland, Mich.

[21] Appl. No.: 789,820

[22] Filed: Oct. 21, 1985

[51] Int. Cl.$^4$ ............................................. C08F 4/62
[52] U.S. Cl. ...................................... 502/102; 502/152; 502/120; 502/132; 502/133; 502/134; 526/125; 526/129; 526/156; 526/160; 556/1
[58] Field of Search ............... 502/102, 152, 120, 132, 502/133, 134; 556/1

[56]  References Cited

U.S. PATENT DOCUMENTS

| | | | |
|---|---|---|---|
| 3,113,115 | 12/1963 | Ziegler et al. | 502/102 X |
| 3,179,580 | 4/1965 | Fukui et al. | 502/102 X |
| 3,257,332 | 6/1966 | Ziegler et al. | 502/102 X |
| 3,288,773 | 11/1966 | Harban et al. | 502/102 X |
| 3,328,447 | 6/1967 | Kottenhahn | 502/102 X |
| 3,341,619 | 9/1967 | Stogryn et al. | 502/102 X |
| 3,392,162 | 7/1968 | Ziegler et al. | 260/94.9 |
| 3,468,856 | 9/1969 | Asai et al. | 502/102 X |
| 3,579,493 | 5/1971 | Ziegler et al. | 502/102 X |
| 3,676,411 | 7/1972 | Throckmorton et al. | 502/102 X |
| 3,681,256 | 8/1972 | Blunt | 252/429 A |
| 3,808,150 | 4/1974 | Yoo | 502/102 |
| 3,905,915 | 9/1975 | Wristers | 252/429 A |
| 3,932,307 | 1/1976 | Setterquist | 252/430 |
| 3,950,269 | 4/1976 | Setterquist | 252/430 |
| 3,971,767 | 7/1976 | Setterquist | 526/65 |
| 4,017,525 | 4/1977 | Setterquist | 260/429.3 |
| 4,097,659 | 6/1978 | Creemers et al. | 526/151 |
| 4,145,497 | 3/1979 | Sylvester et al. | 502/102 X |
| 4,235,746 | 11/1980 | Dietz | 252/429 C |
| 4,244,838 | 1/1981 | Gessell | 252/429 B |
| 4,276,191 | 6/1981 | Karayannis et al. | 252/429 C |

FOREIGN PATENT DOCUMENTS

| | | |
|---|---|---|
| 3007725 | 9/1981 | Fed. Rep. of Germany . |
| 3127133 | 1/1983 | Fed. Rep. of Germany . |
| 810883 | 2/1981 | South Africa . |
| 820263 | 9/1959 | United Kingdom . |
| 820264 | 9/1959 | United Kingdom . |

Primary Examiner—Patrick P. Garvin
Attorney, Agent, or Firm—Price, Heneveld, Huizenga & Cooper

[57]  ABSTRACT

The specification discloses pentaalkylcyclopentadienyl actinide complexes and their use as catalysts for polymerizing lower molecular weight alkenes.

37 Claims, 10 Drawing Figures

ORGANOACTINIDE POLYMER CATALYSTS

BACKGROUND OF THE INVENTION

This invention relates to new catalyst compositions useful for initiating and promoting polymerization of alpha-olefins and to a polymerization process employing such composition.

It is well-known that olefins such as ethylene, propylene, and 1-butene can be polymerized in the presence of metallic catalysts, particularly the reaction products of organometallic compounds and transition metal compounds to form substantially linear polymers of relatively high molecular weight. Typically such polymerizations are carried out at relatively low temperatures and pressures.

Among the methods for producing such linear olefin polymers, some of the most widely utilized are those described by Professor Karl Ziegler in U.S. Pat. Nos. 3,113,115 and 3,257,332. In these methods, the catalyst employed is obtained by admixing a compound of a transition metal of Groups IV-B, V-B, VI-B and VIII of Mendeleeve's Periodic Table of Elements with an organometallic compound. Generally the halides, oxyhalides and alkoxides or esters of titanium, vanadium and zirconium are the most widely used transition metal compounds. Common examples of the organometallic compounds include the hydride, alkyls and haloalkyls of aluminum, alkylaluminum halides, Grignard reagents, alkali metal aluminum hydrides, alkali metal borohydrides, alkali metal hydrides, alkaline earth metal hydrides and the like. Usually, the polymerization is carried out in a reaction medium comprising an inert organic liquid, e.g., an aliphatic hydrocarbon and the aforementioned catalyst. One or more olefins may be brought into contact with the reaction medium in any suitable manner, and a molecular weight regulator, such as hydrogen, is often added to the reaction vessel in order to control the molecular weight of the polymers. Such polymerization processes are either carried out at slurry polymerization temperatures (i.e., wherein the resulting polymer is not dissolved in the hydrocarbon reaction medium) or at solution polymerization temperatures (i.e., wherein the temperature is high enough to solubilize the polymer in the reaction medium).

It has been proposed to use organoactinides in place of organotransition metal compounds. It has been shown that given the same ligand array and specific chemical interactions that organoactinides tend to show greater reactivity than early transition metal complexes. Known actinide complexes which catalyze olefin polymerization include chloride salts of uranium and/or thorium or acetylacetonate complexes thereof. They are insoluble in a reaction medium. They afford poor yields and result in product of widely ranging molecular weight. As a result, they have very limited application.

One researcher has reported polymerizing ethylene without added cocatalysts using a uranium bis-pentamethylcyclopentadienyl dihydride dimer complex which is soluble in commonly used reaction medium. However, such a compound would be difficult to use on a commercial basis since it must be used in a vacuum and must be purified in a vacuum. The dihydride catalyst is highly sensitive to and reactive with moisture, impurities and air.

SUMMARY OF THE INVENTION

In the present invention, we have discovered organoactinide complexes which can be used as olefin polymerization catalysts either homogeneously or supported in inorganic supports. The yields obtained are superior to those obtained with prior organoactinide complex catalysts. The molecular weight range of the resulting product obtained is relatively narrow. Further, they have the same molar activity as organotitanium complexes.

These results are achieved using an organoactinide complex containing at least one, and most preferably two pentaalkylcyclopentadienyl ligands having up to 10 carbons, preferably up to five carbons and most preferably one carbon in each alkyl group, and two other ligands which are most preferably alkyl ligands.

The catalyst has the following general formula:

Where: M represents an actinide metal; Cp' represents pentaalkylcyclopentadienyl; and X, Y and Z represent alkyl, aryl, and halide ligands such as —CH₃ (abbreviated Me herein), —CH₂CMe₃ (or phenyl or other alkyl substituted variations thereof) Cl, Br, —CH₂SiMe₃ (or phenyl or other alkyl substituted variations thereof), but specifically excluding any ligand with beta hydrogen, and X may be another Cp'.

In Use, this organoactinide catalyst is most preferably used in conjunction with an alkylaluminum cocatalyst, the most preferable of those being polymethylaluminoxane. These and other objects, advantages and features of the invention will be more fully understood and appreciated by reference to the following specification.

DESCRIPTION OF THE PREFERRED EMBODIMENT

In the preferred embodiment, ethylene monomer is fed under pressure into a reaction vessel containing pentamethylcyclopentadienyl actinide complex and a cocatalyst in a reaction solvent medium. The catalyst is optionally carried on a support. Ethylene is polymerized at elevated temperature and withdrawn from the reaction vessel.

I.
THE CATALYST

The catalyst comprises an actinide complex having the following general formula:

Where: M represents an actinide metal; Cp' represents pentaalkylcyclopentadienyl; and X, Y and Z represent alkyl, aryl, and halide ligands such as —$CH_3$ (abbreviated Me herein), —$CH_2CMe_3$ (or phenyl or other alkyl substituted variations thereof) Cl, Br, —$CH_2SiMe_3$ (or phenyl or other alkyl substituted variations thereof), but specifically excluding any ligand with beta hydrogen, and X optionally and most preferably comprises another Cp'.

Thus, the catalyst is preferably a bis-pentamethylcyclopentadienyl actinide complex. While a mono-pentamethylcyclopentadienyl actinide complex does catalyze ethylene polymerization, the bis-pentamethylcyclopentadienyl actinide complex is significantly more effective from a commercial standpoint.

Of the actinides, uranium is preferred. Under comparable reaction conditions, and using comparable ligands, the uranium complexes tended to be significantly more effective (Table VI, Section VF supra).

Further, it is most preferable that the other two ligands, Y and Z, be alkyl ligands rather than halides. Thus, CP'$_2$UClMe is preferred to CP'$_2$UCl$_2$ and CP'$_2$UMe(CH$_2$SiMe$_3$) is preferred to either of the foregoing. The large, bulky alkyl groups are less preferred than more compact alkyl groups. The most preferred catalyst found was dimethyl, bis-pentamethylcyclopentadienyl uranium.

Ligands including beta carbon hydrogen are to be avoided, as for example: —$CH_2$—$CH_2$—R The beta hydrogen offers a reactive site for beta hydride elimination, causing the complex to decompose and eliminating its ability to serve as a catalyst. This could significantly change the molecular weight distribution of the polymer being formed.

The actinide complexes were prepared by first reacting pentamethylcyclopentadienyl with isopropyl magnesium chloride in the presence of toluene solvent at 110° C. The resulting pentamethylcyclopentadienyl magnesium chloride.THF was then reacted with the actinide tetrachloride at 100° C. in toluene to form bis-pentamethylcyclopentadienyl actinide dichloride. This in turn can be reacted with appropriate amounts of lithium reagents in ether to form mono or di substituted complexes. These reactions are illustrated below:

*tetrahydrofuran

The foregoing reactions are illustrated in Examples 1–7 below. In the Examples, the actinide is uranium. The procedure is basically the same for preparing the thorium complexes.

II.
THE COCATALYST

The pentaalkylcyclopentadienyl actinide complex catalyst is not effective without a cocatalyst. Usable cocatalyst include organo aluminum compounds, organo lithium compounds and organo magnesium compounds. Ziegler catalysts are generally operable, but some are better than others.

The least effective cocatalysts were those which included halides. Similarly, the large, bulkyl alkyl groups are preferably to be avoided. Thus, the most effective cocatalysts were found to be polymethylaluminoxane, triethyl aluminum and normal butyl lithium. The least effective cocatalysts were those which include halides and large bulky alkyl groups such as triisobutyl aluminum.

III.
MONOMER AND SOLVENTS USED

The catalyst/cocatalyst system of the present invention is principally effective in polymerizing ethylene. However, it is operable in the polymerization and copolymerization of other lower molecular weight alkenes up to 1-octene. Similarly, the catalyst of the present invention is broadly operable in the copolymerization of ethylene with other monomers such as styrene, propylene and allyltrimethylsilane. However, catalytic efficiency is markedly lower in copolymerization. Hence, the most preferred use of the catalyst of the present invention is in the polymerization of ethylene per se.

Conventional polymerization solvents can be used in conjunction with the catalyst of the present invention. Aromatic and aliphatic hydrocarbons such as toluene, xylene, ethyl benzene, heptane, decalin and mineral spirits are examples of operable solvents.

IV.
THE SUPPORT
(Optional)

The catalyst/cocatalyst system of the present invention can be utilized homogenously, i.e., in solution, or in connection with a catalyst support. Conventional catalyst support materials are operable in the present invention. Powdered alumina, powdered silica, powdered magnesium oxide and powdered titanium oxide are all operable. Best results were achieved with dehydrated powdered alumina. Powdered silica was the next best support media. Magnesium oxide and titanium oxide were less effective, magnesium oxide being about eight times better than titanium dioxide, but still three times less active than powdered alumina. Norton ™ SA6173 alumina activated at 950° C. gave the best results. Other aluminas may also be operable to greater or lesser degrees, and experimentation with such alternatives is within the skill of the art.

Magnesium chloride is a standard support used in titanium based catalyst systems for ethylene polymerization. While it is operable in connection with the catalyst of the present invention, it gives relatively very poor results. It is believed that this is due to interference of the bulky chlorine atom with the bulky actinide. Hence, it is preferred that inorganic supports having halogen or other bulky ligands in their molecular structure be avoided.

The support must be activated by heating. The best results for alumina are obtained by activating at 950° C. The support is heated for about one hour at 450° C. while a slow flow of air, and hence oxygen, is passed over the support. Thereafter, nitrogen is fed over the support and the temperature is raised to 950° C. and maintained for about five hours.

In use, a dilute solution of the catalyst, as for example 0.1 gram per 15 milliliters of toluene, is added slowly to the activated alumina and stirred for a substantial period of time, as for example about 18 hours. The clear solvent is then removed in vacuo. The support is then rinsed again with a solvent such as toluene, stirred for a period of time, as for example about one hour, and the solvent is again removed in vacuo.

The ratio of support to catalyst can vary rather broadly. It is expressed herein in terms of metal to metal ratio, e.g., Al:U or Si:U. Best results are obtained in a range of from about 70 to about 100 moles of support metal to mole of catalyst metal. A molar ratio of about 85:1, aluminum to actinide, appears most preferable. Even so, polymerization does occur beyond the extremes of these ranges. Further, the primary impact of variation of this ratio is on efficiency, though it is believed that molecular weight and molecular weight distribution are also affected.

V.

THE POLYMERIZATION PROCESS

The polymerization process is carried out in a generally conventional manner. Gaseous monomer is fed through the catalyst/cocatalyst solution, or support mixture, under pressure. While the pressure can vary substantially without affecting fundamental operability of the invention, i.e., from atmospheric pressure on up, it has been found that yield increases with increased pressure. Pressures of 200 psig and above, as for example to about 500 psig, give excellent yields.

Similarly, the temperature at which the reaction is initiated can vary substantially from about 0° to about 190° C. The optimum initiation temperature range appears to be between 60° and 120° C., with 75° to 85° C. being the most preferred.

Beyond a certain preliminary time, the reaction time was found to have little impact on the molecular weight of the polymer obtained, at least in the support system. Hence in a batch reaction the reaction can be allowed to continue until satisfactory yields have been obtained. In a continuous process, polymerized product can be drawn off in a conventional manner. Molecular weight of the end product is a function of temperature and cocatalyst to catalyst ratio. At initiation temperature above 75° C., lower molecular weights tend to be obtained, e.g., 1500 to 200,000 weight average. Below 75° C., molecular weight can go from 200,000 to 1,000,000.

Molecular weight also increases as one decreases the cocatalyst to catalyst ratio. Hence, one skilled in the art will vary temperature vis-a-vis cocatalyst to catalyst ratio to obtain a desired molecular weight.

In contrast to molecular weight, the yield of polymer per gram of catalyst metal increases as one increases the cocatalyst t catalyst ratio. In terms of operability, that ratio is very very broad, i.e., from about 5:1 to about 16000:1. Greater efficiency, i.e., yields of polymer per gram of catalyst, are experienced with increasing ratios. A ratio of 40:1 shows markedly increased yields over a ratio of 10:1. A ratio of 100:1 shows still superior yields. While yields increase thereafter with increasing cocatalyst to catalyst ratios, the rate of increase begins to diminish somewhat. In the practice of the invention, one skillled in the art will select a cocatalyst to catalyst ratio which will optimize yield, and still result in the end product molecular weight which is desired by the operator.

Catalyst concentration experiments indicate that the catalyst is more efficient at lower concentrations. The catalyst is almost as efficient at 11.8 micromoles per liter of solvent as it is a 882.4 micromoles per liter. At room temperature, the catalyst is more efficient at about 139 micromoles per liter than at 375 micromoles per liter. Even so, catalyst concentration is not particularly critical, in that the catalyst is effective over a broad range of concentrations. Obviously a desire for a higher absolute yield may weigh in some circumstances against the need for high efficiency.

In the homogenous reaction, it is important to add the cocatalyst to the system prior to adding the catalyst, or alternatively to add the two as a premix. Adding the cocatalyst first improves efficiency by a factor of about three. Similarly improved results are obtained using the premix of catalyst and cocatalyst, which is then added to the system.

When a support is used, the optimum ratio of support to catalyst is from about 70 to about 100 moles of support metal to 1 mole of catalyst metal. Effectiveness tapers off above and below those levels, and loadings of less than 40 and greater than 140 moles of support metal to mole of catalyst metal give poor results.

VI.

PREPARATION EXAMPLES

Example 1

Precatalyst Intermediary Preparation

To prepare the pentamethylcyclopentadienyl magnesium chloride THF, a one necked 200 milliliter round bottom flask with a vacuum valve sidearm was equipped with a glass stopper and a magnetic stir. The flask was degassed. Under a flush of argon, 64 milliliters of a 1.95 molar solution of isopropyl magnesium chloride in diethyl ether was syringed into the flask. The diethyl ether was removed in vacuo, leaving a cloudy white mass in the flask. Under a flush of argon, 57 milliliters of dry toluene was added to the flask and one end of an ice cooled trap was connected to the vacuum valve and the other to a vacuum feed line. The trap was degassed and filled with argon and opened to the flask.

Pentamethylcyclopentadiene (22 milliliters) was syringed into the flask under a flow of argon and the flask was then lowered into an oil bath and maintained at 110° C. The solution began to froth due to residual diethylene oxide which was collected in the ice cooled trap. The reaction was stirred for three hours, after which a yellow precipitate was observed. The mixture was cooled to room temperature and 25 milliliters of THF was added under the flow of argon. A white precipitate was observed and then the solvents were removed in vacuo. 114 milliliters of THF was added to dissolve the majority of the solid which was then filtered. THF was removed in vacuo and 25 milliliters of toluene was added. The solid was isolated by filtration and washed. The solid was dried in vacuo and yielded 78% of the desired product.

Example 2

Di-halide Catalyst Preparation 5.83 grams (21.86 millimoles) of the foregoing product of Example 1 was then charged into a 200 milliliter, round bottom flask with a glass vacuum valve sidearm, along with 3.61 grams (9.5 millimoles) of actinide (specifically uranium) tetrachloride. Under a flush of argon, 120 milliliters of dried toluene was added to the flask. The flask was loaded into an oil bath at 95° C. and the reaction was allowed to stir with a magnetic stirer for 50 hours. The stirring was stopped and the mixture was filtered while hot through a course porosity glass frit which had been covered with one inch of Celite TM filter aid. The residual solids were washed twice with 30 milliliter portions of toluene. The washings were combined with the filtrate. The solvent was removed in vacuo. The flask was transferred to an argon glove box where diethyl ether (20 milliliters) was added to the flask to dislodge the solid. The slurried solid was isolated by filtration and solid dried in vacuo. The yield of bis-pentamethylcyclopentadienyl uranium dichloride was 4.13 grams (75% of theoretical).

Example 3

Di-methyl Catalyst Preparation

To prepare dimethyl-bis-pentamethylcyclopentyldienyl actinide, the foregoing actinide complex (2.35 grams—4.06 millimoles) is charged into a 100 milliliter round bottom flask with a glass vacuum valve sidearm along with 20 milliliters of ether. The flask is cooled to −78° C., and under a flush of argon, 5.7 milliliters of 1.6 molar complex of methyl lithium-lithium bromide in diethylether is added via syringe. The mixture is stirred for 15 minutes at −78° C. and then allowed to slowly warm to room temperature. After 1½ hours, the ether is removed in vacuo. 20˙ milliliters of toluene is added, the solution filtered and the solids washed twice with two milliliters of toluene. The washings are combined and the solvent removed in vacuo. Approximately 70% of the theoretical yield of orange-red dimethyl-bis-pentamethylcyclopentadienyl actinide complex is obtained.

Example 4

Preparation of CP'$_2$U(CH$_2$SiMe$_3$)$_2$ Catalyst

The procedure for preparing this complex is the sae as that used for preparing the dimethyl complex except that one uses a slight excess of LiCH$_2$SiMe$_3$ in place of the methyl lithium-lithium bromide complex.

Example 5

Preparation of CP'$_2$UCl(CH$_2$SiMe$_3$) Catalyst

The procedure used is the same as for the Example 4, except that one only uses a single molar equivalent of the lithium reagent. Caution must be taken to limit the reaction time to only one hour, due to a disproportionation reaction which tends to form the CP'$_2$UCl$_2$ and CP'$_2$U(CH$_2$SiMe$_3$)$_2$ complexes.

Example 6

Preparation of CP'$_2$UClMe

A 100 milliliter round bottom flask with a vacuum valve stopcock sidearm with a magnetic stirrer was charged with 1.09 grams (1.95 millimoles) of CP'$_2$UMe$_2$, 1.13 grams (1.95 millimoles) of CP'$_2$UCl$_2$ and toluene (30 milliliters). The flask was removed from the argon glove box and attached to a vacuum line. The flask was lowered into an oil bath and maintained at 50° C. for 2½ hours and then at room temperature for an additional hour. The solution was filtered and the frit washed two times with three mililiters of toluene which was combined with the filtrate. The filtrate was concentrated to 20 milliliters and cooled to −78° C. The solid CP'$_2$UClMe was isolated by cold filtration. The yield was approxmately 60%.

Example 7

A Mono Cp' Complex

The mono Cp' catalysts are prepared as above, beginning with the di-halide of Example 2, except that in the Example 2 procedure, the molar quantity of pentamethylcyclopentadienyl magnesium chloride.THF is reduced by one-half.

Example 8

Activation Of Alumina Support

16th inch extruded pellets of Norton TM SA 6173 alumina were ground with a mortar and pestle such that it would pass through a 60 mesh sieve (250$\mu$ openings). The powder material was loaded into a quartz tube and placed in a furnace. A slow flow of oxygen was passed over the alumina and the temperature of the furnace was raised to 450° C. After one hour at that temperature, a nitrogen line was attached to the tube so that a flow of nitrogen passed over the alumina and the temperature was raised to 950° C. After five hours, the furnace was turned off and allowed to cool to room temperature. The tube was then transferred to a nitrogen filled glove bag and the activated alumina was transferred to sealed glass bottles for subsequent use.

VII.

EXPERIMENTAL RESULT EXAMPLES

A.

Table I, Examples 9 and 10

Order Of Addition Of Catalyst/Cocatalyst

Experimental work illustrates that superior results are achieved by adding the cocatalyst prior to (Table I) or mixed with (Table II), the catalyst. The experimental procedure followed for the Table I Examples is outlined below:
1. Ingredients
Monomer: ethylene Catalyst: bis-pentamethylcyclopentadienyl actinide metal complex having the following formula:

Cocatalyst: triethyl aluminum.
Support: Alumina activated at 950° C.
Solvent: toluene.
2. Conditions
Vessel: dry, degassed 600 ml. glass lined reactor.
Temperature: Room temperature.
Ethylene Pressure: 200 psig.
3. Molar Ratios
Cocatalyst/Actinide Metal: 10:1.
$AL_2O_3$/Actinide Metal: 35:1.
4. Variables
Order of addition of catalyst and cocatalyst.
5. Polymerization Procedure
The dry, degassed 600 ml. glass lined reactor was charged with 110 ml. of toluene. 0.4 cc of a 25% hexane solution of triethyl aluminum was added via syringe to the reactor. After several minutes of stirring, a slurry containing 0.25 grams of uranium complex supported on alumina in 15 ml. of toluene was added. The reaction vessel was pressurized to 200 psig with ethylene and that pressure was maintained for $5\frac{1}{2}$ to $5\frac{3}{4}$ hours. The reaction temperature was recorded, but not controlled. The reaction was terminated by reducing the reaction pressure and adding 2 ml. of a mixture of methanol and isopropanol. The polyethylene was isolated by filtration and vacuum drying.

Alternatively, the uranium complex catalyst and support alumina were added to the reaction vessel first.
6. Results
Results of these experiments are shown in Table I below. As can be seen, the yield of polyethylene was three times as great when the uranium complex catalyst was added after the cocatalyst. It is believed that this difference is the result of the cocatalyst purging the reaction medium solvent of impurities which would otherwise contaminate the uranium complex catalyst. This belief is confirmed by the following experiment (Table II) which reveals that exceptional yields are also obtained when the catalyst and cocatalyst are premixed and added to the reaction medium together.

TABLE I

| Catalyst | Support | hr | Yield | gPE/g Metal |
| --- | --- | --- | --- | --- |
| 9. Cp'$_2$UCl(CH$_2$SiMe$_3$) added first | Al$_2$O$_3$ | 5.50 | 10.35 gms | 731.5 |
| 10. Cp'$_2$UCl(CH$_2$SiMe$_3$) added after cocatalyst | Al$_2$O$_3$ | 5.75 | 31.60 gms | 2149.4 |

B.

Table II, Examples 11-23

Use Of Catalyst/Cocatalyst Premix

1. Ingredients
Monomer: ethylene.
Catalyst: bis-pentamethylcyclopentadienyl, bis-(trimethyl silyl)methyl uranium, or dimethyl, bis-pentamethylcyclopentadienyl uranium.
Cocatalyst: polymethylaluminoxane or triethylaluminum.
Support: magnesium chloride or alumina.
Solvent: isopar E ™ from Exxon, an aliphatic solvent.
2. Conditions
Vessel: one gallon stainless steel reactor.
Temperature: 150° C.
Ethylene Pressure: 450 psi or 335 psi.
3. Molar Ratios
Cocatalyst/Actinide Metal: 2400:1.
Support Metal/Actinide: 70:1.
4. Variables
Pressure, catalyst and cocatalyst. Hydrogen used as a chain transfer agent in some cases. The support was varied. Also, 1-octene was adeed in some Examples. The reactor with 2 liters of solvent added is brought to 150° C. If used, 300 ml 1-octene is charged into the reactor. If used, 200 psig hydrogen charged at the beginning and is used up during reaction. Ethylene monomer is fed under pressure to maintain total reactor pressure of 330 psi or 450 psi. Then, the catalyst/cocatalyst premix was charged into the reactor under pressure using a catalyst bomb.

The results are illustrated in Table II. While direct correlation to the Table I data is not possible due to differences in reaction conditions, the Table II results show far greater yields than Example 9, thus establishing that the addition of the actinide complex in the presence of the cocatalyst, in the form of a premix, also results in excellent yields of polyethylene.

TABLE II @

| | Catalyst | Cocatalyst ⓑ | μmoles metal | ΔH$_2$ | Octene | gm polymer | efficiency gPE/gm Metal |
| --- | --- | --- | --- | --- | --- | --- | --- |
| 12. | Cp'$_2$UMe$_2$ | PMA | 8 | 0 | N | 102.0 | 53,562 |
| 13. | Cp'$_2$UMe$_2$ | PEA | 8 | 0 | N | 41.5 | 21,179 |
| 14. | Cp'$_2$UMe$_2$ | Et$_3$Al ⓒ | 8 | 0 | N | 4.17 | 2,164 |
| 15. | Cp'$_2$Ume$_2$ | PMA ⓒ | 8 | 0 | N | 95.0 | 49,887 |
| 16. | Cp'$_2$UMe$_2$ | PMA | 8 | 200 | N | 78.0 | 40,959 |
| 17. | Cp'$_2$UMe$_2$ ⓓ | PMA | 8 | 0 | Y | 77.0 | 39,642 |
| 18. | Cp'$_2$UMe$_2$ ⓓ | PMA | 8 | 100 | Y | 67.5 | 34,751 |
| 19. | Cp'$_2$UMe$_2$ ⓓ | PMA | 8 | 200 | Y | 77.8 | 40,053 |

TABLE II [a] -continued

| 11. Catalyst | Cocatalyst [b] | μmoles metal | ΔH₂ | Octene | gm polymer | efficiency gPE/gm Metal |
|---|---|---|---|---|---|---|
| 20. Cp'₂UMe₂ | — | 28 | 200 | N | 22.4 | 3,361 |
| 21. Cp'₂UMe₂/MgCl₂ [@] | PMA | 8 | 0 | Y | 45.0 | 23,634 |
| 22. Cp'₂UMe₂/Al₂O₃ [@] | PMA | 40 | 0 | N | 98 | 10,292 |
| 23. Cp'₂UMe₂/Al₂O₃ [@] | PMA | 40 | 200 | Y | 82 | 8,613 |

[a] general reaction conditions, 10 minutes, 450 psig total pressure, 150° C., cocatalyst aluminum/uranium = 2389:1.
[b] PMA = polymethylalumoxane dimer, PEA = polyethylaluminoxane dimer
[c] Al/U = 4000:1
[d] Total pressure 340 psig

C.

Table III

Examples 24–26

Importance Of Using Cocatalyst

The ingredients, conditions and procedure followed in the Examples 24–26 were basiclly the same as used in Examples 9 and 10 above. However the variables involved the use of the catalyst alone, the use of the catalyst in conjunction with the cocatalyst, and the use of the cocatalyst alone. No support was used in these Examples. Hence, the catalyst was added directly to the reaction medium without first being fixed with a support. Finally in Example 24 in which the actinide complex was used in conjunction with a cocatalyst, the actinide complex was added *before* the cocatalyst.

The Table III results show that when the catalyst and cocatalyst were used by themselves, there was almost no yield of polyethylene. In contrast, the combination yielded polyethylene in a ratio of 172.7 grams per gram of actinide metal, even though the less preferred procedure of adding catalyst first was followed.

TABLE II [@]

| Catalyst [b] | Support | hr | Yield | gPE/g Metal |
|---|---|---|---|---|
| 24. Cp'₂U(CH₂SiMe₃)₂ | — | 5.50 | 9.00 | 172.7 |
| 25. Cp'₂U(CH₂SiMe₃)₂ [c] | — | 5.50 | 0.00 | — |
| 26. TEA [d] | — | 19.50 | 0.45 | 1.0 |

[a] Rxn conditions: Room temperature, 200 psig ethylene, 110 ml toluene cocatalyst TEA:Metal = 10:1
[b] order of additiion of reagents: Metal complex, cocatalyst and ethylene
[c] no cocatalyst
[d] no catalyst

D.

Table IV

Examples 27–34

Cocatalyst/Catalyst Ratio

1. Ingredients
Monomer: ethylene.
Catalyst: Cp'₂UMe₂.
Cocatalyst: polymethylaluminoxane.
Support: None.
Solvent Medium: Toluene.
2. Conditions
Vessel: dry degassed 600 ml. glass lined reactor vessel.
Temperature: Room temperature, 70° C. or 75° C.
Reaction time: one-half hour
Ethylene Pressure: 200 psig.
3. Molar Ratios
Cocatalyst/actinide variable from 2.7 to 16,190.
4. Variables
The primary variable in these experiments is obviously the ratio of cocatalyst to catalyst.
5. Polymerization Procedure
The procedure followed is basically the same as outlined for Examples 9 and 10 above. However, no support was used. In all cases, the cocatalyst was added to the reaction medium first.
6. Results
The Table IV results show markedly increased yields when the concentration of catalyst relative to cocatalyst is kept low. Though not reported in Table IV, ratios as high as 16000:1 have been used successfully. Yet, both the catalyst and the cocatalyst must be present in the system. The operable range ratio for cocatalyst to catalyst will vary with reaction conditions and the like, but falls someplace between about 5:1 and about 16000:1. As a practical matter, one would use somewhat lower ratios than 16000:1 in order to use less polymethylaluminoxane or other cocatalyst. Also, the molecular weight of the product is very low at ratios of 16000:1. A more practical upper limit is about 6000:1. The optimum range depends on your objective. If you seek increased efficiency, you select higher ratios. To increase molecular weight of the product, you use lower ratios.

TABLE IV [@]

| | PMA [b] | PMA:U | °C. [c] | gPE/gU [d] |
|---|---|---|---|---|
| 27. | 3.56 × 10⁻² M | 4539.0 | 70 | 106,046 |
| 28. | 2.37 × 10⁻² M | 3030.0 | 75 | 98,870 |
| 29. | 1.19 × 10⁻² M | 1515.0 | 75 | 86,892 |
| 30. | 2.37 × 10⁻³ M | 303.0 | 75 | 63,390 |
| 31. | 8.61 × 10⁻⁴ M | 110.0 | 75 | 46,384 |
| 32. | 2.11 × 10⁻⁵ M | 2.7 | 75 | — |
| 33. | 1.90 × 10⁻⁴ M | 25.0 | 75 | good yield, about 15,000–20,000, but sample misplaced prior to weighing |
| 34. | 3.91 × 10⁻⁴ M | 50.0 | 75 | 34,492 |

[a] 190 ml toluene, 200 psig of ethylene, ½ hour, 1.5 μmoles metal
[b] molar solution of Al in reactor
[c] temperature
[d] efficiency

E.

Table V

Examples 35–43

Varying Cocatalysts

1. Ingredients
Monomer: Ethylene
Catalyst: bis-pentamethylcyclopentadienyl actinide metal complex having the following formula:

$$Cp'_2U\begin{matrix}Cl\\CH_2SiMe_3\end{matrix}$$

Cocatalyst: ethyl aluminum dichloride, diethyl aluminum chloride, triethyl aluminum, trimethyl aluminum, triisobutylaluminum, polymethylaluminoxane, normal butyl lithium, or dibutyl magnesium.

Support: Alumina activated at 950° C. as in Examples 9 and 10 above.

Reaction Medium Solvent: Toluene.

2. Conditions
Vessel: Dry, degassed 600 ml. glass lined reactor.
Temperature: Room temperature.
Ethylene Pressure: 200 psig.

3. Molar Ratios
Cocatalyst/Actinide: 20:1.
Support Aluminum/Actinide: 70:1.

4. Variables
The cocatalyst.

5. Polymerization Procedure

The procedure followed in these experiments was as outlined in Section A above. The Table V results show the most effective cocatalysts to be polymethylaluminoxane, triethyl aluminum and normal butyl lithium. The least effective cocatalysts were those which include halides. Similarly, the triisobutylaluminum was not particularly effective. These results suggest that cocatalysts including halogens and large, bulky alkyl groups are preferably avoided.

TABLE V [a]

| | Cocatalyst [b] | Hr | Yield | gPE/gMetal [c] |
|---|---|---|---|---|
| 35. | EtAlCl$_2$ | 5.75 | 0.5 | 35.4 |
| 36. | Et$_2$AlCl | 5.75 | 0.5 | 35.4 |
| 37. | Et$_3$Al | 5.75 | 31.6 | 2150.0 |
| 38. | Me$_3$Al | 6.00 | 16.4 | 1162.7 |
| 39. | (i-bu)$_3$Al | 5.50 | 3.0 | 244.4 |
| 40. | Et$_3$Al [d] | 2.50 | 28.8 | 2532.5 |
| 41. | PMA[e] [d] | 2.50 | 25.0 | 2447.0 |
| 42. | n-butyl lithium [d] | 2.0 | 23.1 | 2096.2 |
| 43. | dibutylMg [d] | 2.0 | 22.5 | 1116.2 |

[a] RXN conditions: Support Al:U = 70:1; 200 psig ethylene; 160 ml toluene; 20:1 cocatalyst:U; room temperature
[b] Molar concentration of active alkyl groups constant
[c] efficiency
[d] new catalysts-ran at a later date
[e] polymethylaluminoxane Me$_2$(OAlMe)$_n$—Me  n = 3,4

F.

Table VI and VII

Examples 44–57

Effect Of Varying Catalysts

The experiments reported in Table VI were conducted generally in accordance with the procedure and parameters set forth for Examples 9 and 10, except that 75 ml. of toluene were used as the reaction medium solvent, the ethylene pressure was only 10, 120 or 200 psig and the cocatalyst to actinide molar ratio was 10:1 or 40:1. The reactions were conducted at room temperature. The catalyst was always added before the cocatalyst.

The procedure and parameters for Table VII were similar to those in Examples 9 and 10, except that polymethylaluminoxane was used as the cocatalyst, the cocatalyst ratio was 462:1, the reaction was conducted at 70° C., 190 ml. of toluene were used and the ethylene pressure was 200 psig.

The Table VI results suggest that the preferred actinide metal is uranium rather than thorium. Secondly, looking first at the thorium complex, when both the X and Y ligands were halogens, the yields were not as great as when only one was a halogen and the other was an alkyl group. Further when both the X and Y ligands were alkyl groups, specifically methyl, the results were even better.

The Table VII results suggest further that when the two additional ligands are smaller, more compact alkyl groups as opposed to more bulky alkyl groups, superior yields are achieved. Hence, the most preferred catalyst found pursuant to these experiments was dimethyl-bis-pentamethylcyclopentadienyl uranium.

While the best Table VI results were obtained using Cp'UCl$_3$, it will be noted that the TEA:U ratio in Examples 52–54 was 40:1 versus 10:1 for Example 51 and the other Examples. The activity/efficiency of Cp'$_2$UMe$_2$ would be much greater at a cocatalyst/catalyst ratio of 40:1. Hence, the Cp'Cl$_1$-complexes are less preferred, though operable.

TABLE VI

| | Catalyst [c] | Support [d] | Psig | Hr | Yield | gPE/g Metal |
|---|---|---|---|---|---|---|
| 44. | Cp'$_2$ThCl$_2$ | Al$_2$O$_3$ | 10 [a] | 6.00 | 0.45 | 18.1 |
| 45. | Cp'$_2$ThCl(Me) | Al$_2$O$_3$ | 10 [a] | 23.00 | 0.45 | 20.8 |
| 46. | Cp'$_2$ThMe$_2$ | Al$_2$O$_3$ | 10 [a] | 5.5 | 0.55 | 25.4 |
| 47. | Cp'$_2$UCl$_2$ | Al$_2$O$_3$ | 10 [a] | 22.25 | 1.02 | 43.3 |
| 48. | Cp'$_2$UCl(Me) | Al$_2$O$_3$ | 10 [a] | 21.00 | 1.93 | 139.5 |
| 49. | Cp'$_2$UCl(CH$_2$SiMe$_3$) | — | 200 [b] | 5.50 | 5.60 | 92.7 |
| 50. | Cp'$_2$U(CH$_2$SiMe$_3$)$_2$ | — | 200 [b] | 5.75 | 9.04 | 172.7 |
| 51. | Cp'$_2$U Me$_2$ | — | 120 [b] | 5.75 | 18.60 | 420.5 |
| 52. | Cp'UCl$_3$ [e] | Al$_2$O$_3$ | 200 [b] | 2.5 | | 600 |
| 53. | Cp'UCl(CH$_2$SiMe$_3$)$_2$ [e] | Al$_2$O$_3$ | 200 [b] | 2.5 | | 273 |
| 54. | Cp'U(CH$_2$SiMe$_3$)$_3$ [e] | Al$_2$O$_3$ | 200 [b] | 2.5 | | 306 |

[a] low pressure, room temperature, 75 ml toluene, cocatalyst TEA:Metal = 10:1
[b] high presure, RT, 110 ml toluene, cocatalyst TEA:Metal = 10:1
[c] Cp' = Me$_5$C$_5$; order of addition of reagents, metal complex, cocatalyst, ethylene
[d] Al$_2$O$_3$:Metal = 35:1, i.e., Al:Metal = 70:1
[e] TEA:U = 40:1, 170 ml toluene

TABLE VI [a]

| | Catalyst Complex | μMoles Metal | Cocatalyst | Al:U [b] | °C. [c] | Hr | gPE/gU [d] |
|---|---|---|---|---|---|---|---|
| 55. | Cp'$_2$UCl(CH$_2$SiMe$_3$) | 46.00 | PMA | 282 | RT | 2.0 | 717 |

TABLE VI[a] -continued

| Catalyst Complex | μMoles Metal | Cocatalyst | Al:U[b] | °C.[c] | Hr | gPE/gU[d] |
|---|---|---|---|---|---|---|
| 56. Cp'$_2$U(CH$_2$SiMe$_3$)$_2$ | 21.10 | PMA | 462 | 70 | 2.0 | 7900 |
| 57. Cp'$_2$UMe$_2$ | 20.00 | PMA | 462 | 70 | 2.0 | 21,650 |

[a] toluene 190 ml, ethylene 200 psig
[b] cocatalyst:uranium
[c] RT = room temperature
[d] efficiency

G.

Table VIII

Examples 58–77

Effect Of Support On Catalyst Activity

The Table VIII experiments were conducted generally in accordance with the procedure outlined for Examples 9 and 10 above. The support metal to uranium molar ratio was higher, i.e., 70:1, except in the case of silica in which a 62:1 ratio was used. All the supports were used as fine powders, i.e., approximately 250 micron.

Both the support type, the degree of activation (in the case of alumina) and the surface area of the supports were varied.

As can be seen by the test results reported in Table VIII, the Norton™ S.A. 6173 (abbreviated "N" in Table VIII) alumina activated at 950° C. gave by far the best results. This was followed by the other Norton™ aluminas, Degussia™ mixed silica-aluminas and Alpha™ silicas. The latter all generally formed a second group of very effective supports.

The invention was operable with magnesium oxide and tin oxide supports, but the supports did not perform as well as the others. Both have fairly low surface areas and low activities, with magnesium oxide being eight times better than tin oxide, but still three times less active than the best alumina.

While catalyst surface area generally does not appear to be too significant a variable, there is a point beyond which increasing surface area is counterproductive. For example, the silicon oxide at a surface area of 525 meters per gram afforded less yield than the silicon oxide with a surface area of 299 square meters per gram. For a given support, catalyst activity seems to drop off as the surface area begins to exceed about 300 square meters per gram. This is probably a function of decreasing pore size in the support, which are too small for the actinide complex to have access to.

With the mixed fumed silica-alumina supports, an increase in alumina content of from 1 to 13% almost doubled catalytic activity.

TABLE VIII[a]

| Support | Hr | M$^2$/gm[b] | gPE/gU[c] |
|---|---|---|---|
| 58. TiO$_2$ | 2.5 | 81 | 113.0 |
| 59. MgCl$_2$ | 5.5 | 12 | 342.0 |
| 60. MgO | 2.5 | 48 | 920.3 |
| 61. SiO$_2$ (58 μpore) | 2.5 | 525 | 1151.5 |
| 62. SiO$_2$ (70 μpore) | 2.5 | 299 | 2054.3 |
| 63. SiO$_2$—Al$_2$O$_3$ (1%)[d,e] | 2.5 | 160 | 1003.4 |
| 64. SiO$_2$—Al$_2$O$_3$ (13%)[d,f] | 2.5 | 160 | 1752.7 |
| 65. Al$_2$O$_3$ (Degussia-C)[e] | 2.5 | 95 | 353.2 |
| 66. Al$_2$O$_3$ (C.Pwd, 950° C.)[g] | 2.5 | 150 | 68.0 |
| 67. Al$_2$O$_3$ (C.Pwd, 550° C.)[g,h] | 2.5 | 230 | 48.9 |
| 68. Al$_2$O$_3$ (C.Pwd, PDH 400° C.)[g] | 2.5 | 117 | 483.2 |
| 69. Al$_2$O$_3$ (C.Pellets 950° C.) | 2.5 | 155 | 1586.5 |
| 70. Al$_2$O$_3$ (C.Pellets 550° C.) | 2.5 | 180 | 319.5 |
| 71. Al$_2$O$_3$ (N—6173,DH,950° C.)[i] | 4.5 | 150 | 2631.5 |
| 72. Al$_2$O$_3$ (N—6173,PDH,400° C.)[i] | 4.5 | 137 | 1751.0 |
| 73. Al$_2$O$_3$ (N—6173,950° C.) | 2.5 | 150 | 2153.4 |
| 74. Al$_2$O$_3$ (N—6173,550° C.)[i] | 2.5 | 180 | 220.7 |
| 75. Al$_2$O$_3$ (N—6174,950° C.) | 2.5 | 200 | 1752.7 |
| 76. Al$_2$O$_3$ (N—6175,950° C.) | 2.5 | 170 | 1135.6 |
| 77. Al$_2$O$_3$ (N—6176,950° C.) | 2.5 | 175 | 1852.0 |

[a] support metal to uranium = 70:1, 200 psig ethylene, room temperature
[b] surface area of support
[c] efficiency, per gram metal
[d] fumed silica or alumina
[e] Degussia MOX-170
[f] Degussia COK-84
[g] Conoco SB powder
[h] PDH, partially dehydroxylated
[i] dehydroxylated; N = Norton Alumina

H.

Figure 1:
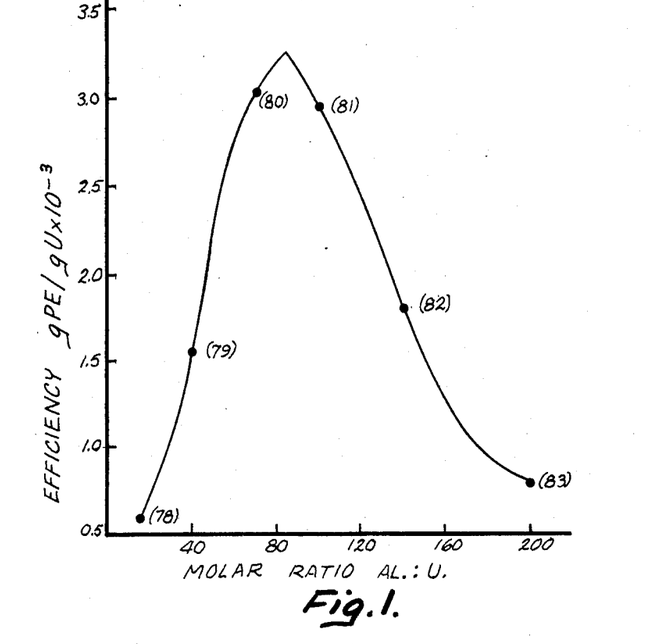
FIG. 1 is a chart of the efficiency of the catalyst of the present invention as a function of the molar ratio of support aluminum to uranium.

FIG. 1 Examples 78–83

Effect Of Support To Uranium Ratio

In Examples 78–83, the ingredients and procedure followed were generally the same as that for Examples 9 and 10, except that the reaction was carried on for 2½ hours at 50° C., instead of for 5½ hours at room temperature. The cocatalyst was added before the catalyst.

FIG. 1, which charts the results of these experiments, reveals that the optimum ratio of support to catalyst is from about 70 to about 100 moles of support metal to 1 mole of catalyst metal. Effectiveness tapered off above and below those levels, and loadings of less than 40 and greater than 140 moles of support metal to moles of catalyst metal gave poor results.

I.

Table IX Examples 84–88

Effect Of Catalyst Concentration

Examples 84–88 were conducted generally in the same manner as Examples 9 and 10, except that in Example 88, the temperature was 52° C. instead of room temperature. The cocatalyst was added first. The molar ratio of cocatalyst to catalyst metal was 40:1 instead of 10:1 and 170 milliliters of toluene were used in place of 110 milliliters.

The variable in this series of experiments was the quantity of catalyst and cocatalyst. In this way, efficiency as a function of catalyst concentration was measured.

The Table IX results show that once you exceed a certain minimal threshold level, the catalyst is more efficient at lower concentrations. For example, catalyst was almost as efficient at 11.8 micromoles per liter of solvent reactant as it was at 882.4 micromoles per liter. Given room temperature reaction, the catalyst was more efficient at about 139 micromoles per liter than it was at 375 micromoles per liter. Clearly, however, the catalyst is effective over a broad range of concentrations.

TABLE IX

| Cocatalyst | μmole catalyst | μmoles catalyst per liter | °C | Hr | gPE/gμ |
|---|---|---|---|---|---|
| 84. TEA | 2.0 | 11.8 | RT | 2.5 | 410 |
| 85. TEA | 23.6 | 138.8 | RT | 2.5 | 2361 |
| 86. TEA | 63.8 | 375.3 | RT | 2.5 | 1411 |
| 87. TEA | 150.0 | 882.4 | RT | 2.5 | 560 |
| 88. TEA | 47.5 | 279.4 | 52 | 2.0 | 2900 |

[a] 200 psig ethylene, toluene 170 ml, Support Al:U = 70:1
[b] 40:1 cocatalyst Al:U
[c] RT = room temperature
[d] efficiency

J.

Figure 2:
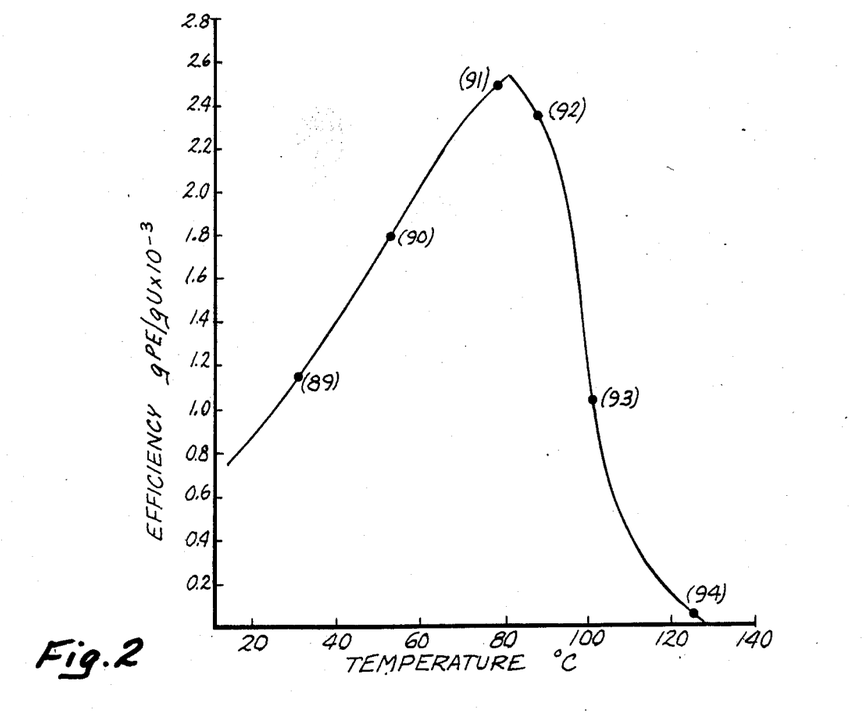
FIG. 2 is a chart of the efficiency of the catalyst of the present invention as a function of polymerization temperature.
Figure 3A:
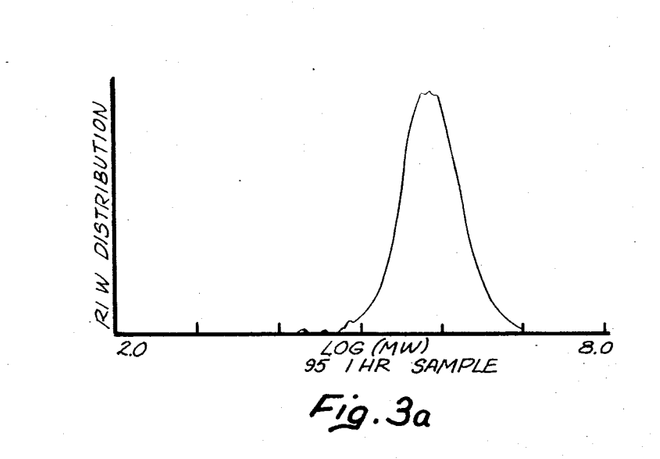
FIGS. 3a–d comprise charts of molecular weight distribution for reaction product obtained from four separate experiments wherein the reaction was allowed to continue for one hour, one and a quarter hours, one and a half hours and two and a half hours respectively.
Figure 3B:
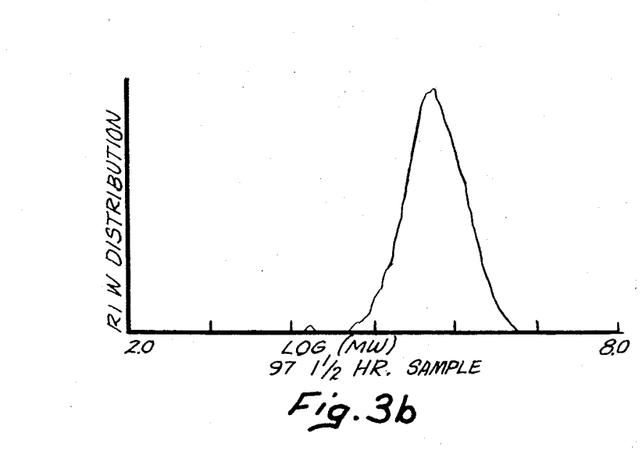
Figure 3C:
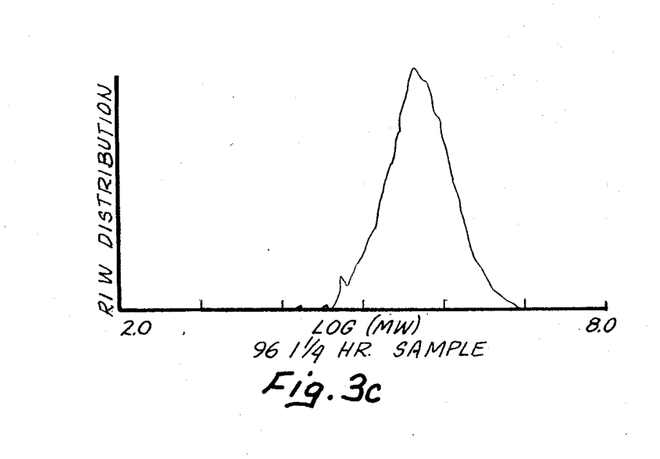
Figure 3D:
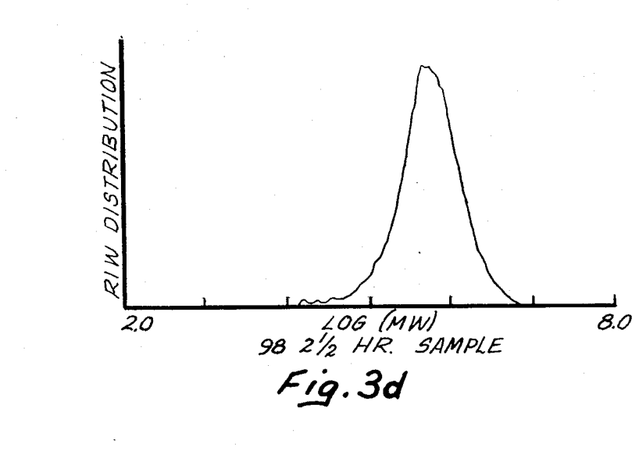
Figure 4A:
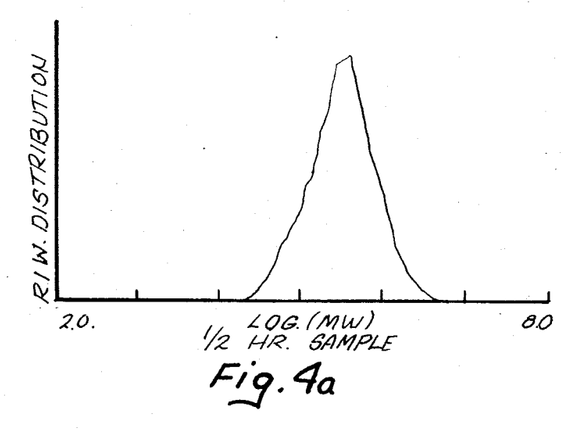
FIGS. 4a–d comprise molecular weight distribution charts for four different reaction product samples removed from the reaction one-half hour, one hour, one and a half hours and two and a half hours respectively.
Figure 4B:
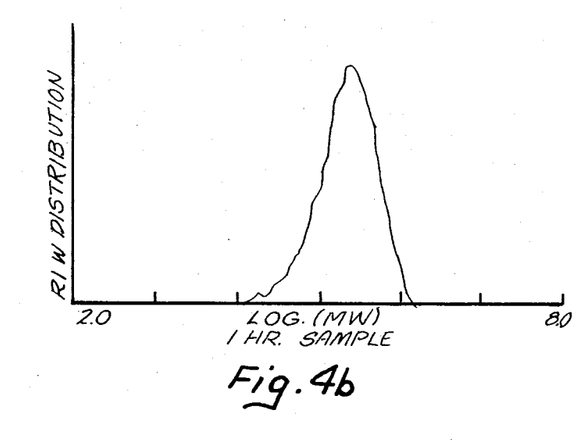
Figure 4C:
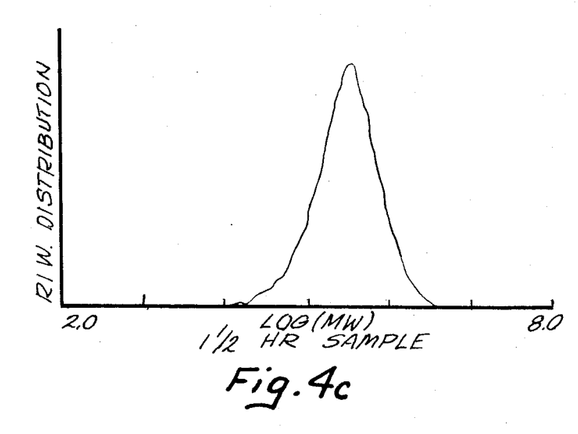
Figure 4D:
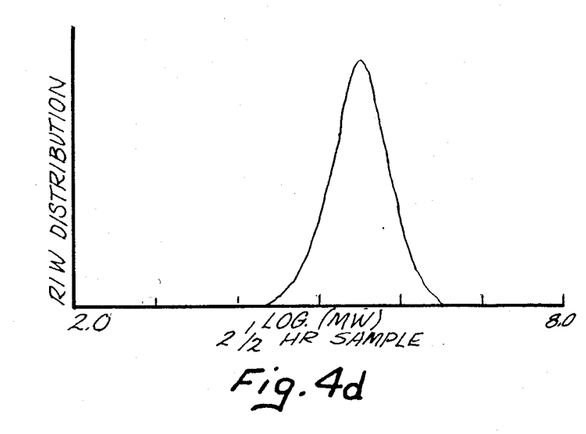

FIG. 2 Examples 89-94

Effect Of Temperature

The FIG. 2 examples were conducted using the following actinide complex supported on silica (58 micron pore size) in a 62:1 $SiO_2$:U molar ratio, with triethylaluminum as the cocatalyst:

In other aspects, the procedure followed was generally that of Examples 9 and 10, with the catalyst being added prior to the cocatalyst. In each case, the temperature of initiation is recorded. It must be kept in mind that the actual reaction temperature is probably somewhat higher since an exotherm of 15°-30° C. was observed. Ethylene was added at 200 psig.

FIG. 2 illustrates that the optimum initiation temperature is from 70°-85° C. Similar results were obtained using the same catalyst/cocatalyst combination supported on alumina.

K.

FIGS. 3 and 4 Examples 95-99

Effect Of Reaction Time On Molecular Weight

For the FIGS. 3 and 4 examples, the foregoing catalyst, an alumina support and triethylaluminum were utilized at room temperature. Ethylene pressure was 200 psig. In the FIG. 3 examples, four separate experiments (95-98) were run at four different times. In the FIG. 4 example (99), a sample of polyethylene was removed at ½ hour intervals.

The results in both cases are comparable. The number average molecular weight, weight average molecular weight and peek molecular weight were all very similar and fall within a relatively narrow band. Hence, reaction time did not have a significant impact on the molecular weight of the product obtained. Chain transfer seems to be occurring in the 700,000-1,000,000 molecular weight range.

Molecular weight determinations were made using gel permeation chromatography. Trichlorobenzene was used as the solvent. The temperature was 135° C.

The foregoing illustrate the scope and range of the present invention. Of course, it is understood that these specific examples of catalysts can be modified without departing from the spirit and scope of the invention as set forth in the appended claims.

The embodiments of the invention in which an exclusive property or privilege is claimed are defined as follows:

1. A catalyst for polymerizing lower molecular weight alkenes comprising:
a pentaalkylcyclopentadienyl actinide complex having up to 10 carbons in each alkyl group and having the following general formula:

Where: M represents an actinide metal; Cp' represents pentaalkylcyclopentadienyl; and X, Y and Z represent alkyl, aryl, and halide ligands, but specifically excluding any ligand with beta hydrogen, and X may be another Cp'.

2. The catalyst of claim 1 which comprises a bis-pentamethylcyclopentadienyl actinide complex.

3. The catalyst of claim 2 in which the other ligands of said complex are alkyl ligands.

4. The catalyst of claim 3 in which said alkyl ligands are compact alkyl groups.

5. The catalyst of claim 4 in which said alkyl groups are methyl groups.

6. The catalyst of claim 5 in which said actinide metal is uranium.

7. The catalyst of claim 2 in which said actinide metal is uranium.

8. The catalyst of claim 7 in which the other ligands of said complex are alkyl ligands.

9. The catalyst of claim 8 in which said alkyl ligands are compact alkyl groups.

10. A catalyst combination for polymerizing lower molecular weight alkenes comprising:
a pentaalkylcyclopentadienyl actinide complex catalyst, having up to 10 carbons in each alkyl group, mixed with an organo metallic catalyst, said pentaalkylcyclopentadienyl actinide complex having the following general formula:

where: M represents an actinide metal; Cp' represents pentaalkylcyclopentadienyl; and X, Y and Z represent alkyl, aryl, and halide ligands, but specifically excluding any ligand with beta hydrogen, and X may be another Cp'.

11. The catalyst combination of claim 10 in which said complex comprises a bis-pentamethylcyclopentadienyl actinide complex.

12. The catalyst combination of claim 11 in which the other ligands of said complex are alkyl ligands.

13. The catalyst combination of claim 12 in which said alkyl ligands are compact alkyl groups.

14. The catalyst combination of claim 13 in which said alkyl groups are methyl groups.

15. The catalyst combination of claim 14 in which said actinide metal is uranium.

16. The catalyst combination of claim 12 in which said actinide metal is uranium.

17. The catalyst combination of claim 16 in which the other ligands of said complex are alkyl ligands.

18. The catalyst combination of claim 17 in which said alkyl ligands are compact alkyl groups.

19. The catalyst combination of claim 16 in which said organo metallic cocatalyst comprises an alkyl metallic material.

20. The catalyst combination of claim 19 in which the alkyl ligands of said alkyl metallic cocatalyst are compact alkyl ligands.

21. The catalyst combination of claim 20 in which said organo metallic cocatalyst is selected from the group consisting of polymethylaluminoxane, triethyl aluminum and normal butyl lithium.

22. The catalyst combination of claim 10 in which said organo metallic cocatalyst comprises an alkyl metallic material.

23. The catalyst combination of claim 22 in which the alkyl ligands of said alkyl metallic cocatalyst are compact alkyl ligands.

24. The catalyst combination of claim 23 in which said organo metallic cocatalyst is selected from the group consisting of polymethylaluminoxane, triethyl aluminum and normal butyl lithium.

25. The catalyst combination of claim 10 in which said catalyst is carried on a metallic oxide or metallic chloride support.

26. The catalyst combination of claim 25 in which said support is selected from the group consisting of powdered alumina, powdered silica, powdered magnesium oxide, powdered magnesium chloride and powdered titanium oxide.

27. The catalyst combination of claim 26 in which said support comprises dehydrated powdered alumina activated at about 950° C.

28. The catalyst combination of claim 26 in which said complex comprises a bis-pentamethylcyclopentadienyl actinide complex.

29. The catalyst combination of claim 25 in which said complex comprises a bis-pentamethylcyclopentadienyl actinide complex.

30. The catalyst combination of claim 29 in which the other ligands of said complex are alkyl lignads.

31. The catalyst combination of claim 30 in which said alkyl ligands are more compact alkyl groups.

32. The catalyst combination of claim 31 in which said organo metallic cocatalyst comprises an alkyl metallic material.

33. The catalyst combination of claim 32 in which the alkyl ligands of said alkyl metallic cocatalyst are compact alkyl ligands.

34. The catalyst combination of claim 33 in which said organo metallic cocatalyst is selected from the group consisting of polymethylaluminoxane, triethyl aluminum and normal butyl lithium.

35. The catalyst combination of claim 25 in which the ratio of said cocatalyst to said catalyst is from about 5 to about 16000.

36. The catalyst combination of claim 10 in which the ratio of said cocatalyst to said catalyst is from about 5 to about 16000.

37. The catalyst combination of claim 10 in which the catalyst and cocatalyst are present in a reaction medium solvent at a catalyst concentration of between about 11 and 890 micromoles per liter of solvent.

* * * * *